(12) United States Patent
Che et al.

(10) Patent No.: US 10,923,268 B2
(45) Date of Patent: Feb. 16, 2021

(54) WIRELESS POWER TRANSMITTING MODULE AND INSTALLATION METHOD THEREOF

(71) Applicant: Delta Electronics,Inc., Taoyuan (CN)

(72) Inventors: Liangsong Che, Taoyuan (CN); Tianding Hong, Taoyuan (CN); Shuailin Du, Taoyuan (CN); Yongkai Liao, Taoyuan (CN); Meng Wang, Taoyuan (CN)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/564,184

(22) Filed: Sep. 9, 2019

(65) Prior Publication Data
US 2020/0111600 A1 Apr. 9, 2020

(30) Foreign Application Priority Data

Oct. 8, 2018 (CN) .......................... 201811168249.8

(51) Int. Cl.
*H01F 27/28* (2006.01)
*H01F 27/245* (2006.01)
*H02J 50/10* (2016.01)

(52) U.S. Cl.
CPC ......... *H01F 27/288* (2013.01); *H01F 27/245* (2013.01); *H02J 50/10* (2016.02)

(58) Field of Classification Search
CPC .. H01F 27/288; H01F 27/245; H01F 27/2885; H01F 27/306; H01F 27/02; H01F 27/40; H01F 27/36; H01F 38/14; H01F 27/022; H01F 27/327; H01F 27/06
See application file for complete search history.

(56) References Cited

U.S. PATENT DOCUMENTS

| 10,283,997 | B2 * | 5/2019 | Satyamoorthy | ...... H04B 5/0037 |
| 10,485,478 | B1 * | 11/2019 | Mirov | .................. A61B 5/1455 |
| 2004/0257190 | A1 | 12/2004 | Peck et al. | |
| 2015/0364938 | A1* | 12/2015 | Lapetina | ................. H01F 38/14 |
| | | | | 320/114 |

(Continued)

FOREIGN PATENT DOCUMENTS

| CN | 1097276 C | 12/2002 |
| CN | 101271762 A | 9/2008 |

(Continued)

OTHER PUBLICATIONS

CN1OA for CN application No. 201811168255.3 dated Jul. 1, 2019.
The CN1OA issued Aug. 4, 2020 by the CNIPA.

*Primary Examiner* — Jared Fureman
*Assistant Examiner* — Emmanuel Dominique
(74) *Attorney, Agent, or Firm* — Yunling Ren

(57) ABSTRACT

The present disclosure provides a wireless power transmitting module and an installation method thereof, wherein the wireless power transmitting module comprises: an insulating bracket, a first side of which has a first central space; a coil, disposed around the first central space; and a circuit component, at least a part of which is located in the first central space, electrically connected to the coil. The present disclosure makes full use of the central blank space of the coil, and places the circuit component at the center of the coil, thereby realizing a miniaturized structure, improving space utilization and greatly reducing volume.

15 Claims, 7 Drawing Sheets

(56) References Cited

U.S. PATENT DOCUMENTS

| | | | |
|---|---|---|---|
| 2016/0268848 A1* | 9/2016 | Nalbant | H02J 7/025 |
| 2017/0324170 A1* | 11/2017 | Kerselaers | H04B 5/0031 |
| 2018/0069600 A1* | 3/2018 | Kowalski | H01F 27/2823 |

FOREIGN PATENT DOCUMENTS

| | | |
|---|---|---|
| CN | 101615496 A | 12/2009 |
| CN | 101651031 B | 7/2011 |
| CN | 104578439 A | 4/2015 |
| CN | 106328356 A | 1/2017 |
| CN | 106684935 A | 5/2017 |
| CN | 107025989 A | 8/2017 |
| CN | 107768121 A | 3/2018 |
| CN | 108364761 A | 8/2018 |
| JP | 2000092752 A | 3/2000 |

\* cited by examiner

A-A

US 10,923,268 B2

WIRELESS POWER TRANSMITTING MODULE AND INSTALLATION METHOD THEREOF

CROSS-REFERENCE TO RELATED APPLICATIONS

This application is based upon and claims priority to Chinese Patent Application No. 201811168249.8, filed on Oct. 8, 2018, the entire contents thereof are incorporated herein by reference.

TECHNICAL FIELD

The present disclosure relates to the field of energy transmission, particularly to a wireless power transmitting module and an installation method thereof.

BACKGROUND

Wireless power transmission is non-contact power transmission, which does not need to use a cable to connect a power-consuming module with a power supply system, wherein, each of the power supply system and the power-consuming module has no exposed conductive contact. In addition, the wireless power transmission technology realizes physical isolation between the power-consuming module and the power supply system, such that various disadvantages brought by contact power transmission may be fundamentally eliminated.

When the wireless power transmitting module is used as a transmitting device or a receiving device, it may include a coil, a compensation circuit, a power circuit, a control circuit, and the like, classified by functions thereof. In the existing design, the coil and the circuit are often separated from each other, that is, the coil is separately used as a transmission pad, and all of the compensation circuit, the power circuit and the control circuit are disposed outside the transmission pad. However, this design will cause a high voltage on the connection wire between the circuit and the transmission pad, which causes great trouble for handling the safety distance between the terminals of the connection wire and for selecting type of the connection wire.

In addition, the coil and the circuit may be integrated together to form one component, wherein the coil is on one side and the circuit is on the other side, and magnetic shielding between the coil and the circuit is performed by a magnetic unit or a metal part, so as to weaken interference of the magnetic field generated by the coil on the circuit. However, this design makes the entire wireless power transmitting module bulky, which is hard to realize a miniaturized structure.

SUMMARY

Aiming at the problems in the prior art, the object of the present disclosure is to provide a wireless power transmitting module and an installation method thereof, by making full use of the central blank space of the coil, and placing the circuit component at the center of the coil, to realize a miniaturized structure, improve space utilization and greatly reduce volume.

The embodiments of the present disclosure provides a wireless power transmitting module, including: an insulating bracket, wherein a first side of the insulating bracket has a first central space; a coil, disposed to around the first central space; and a circuit component, wherein at least a part of the circuit component is located in the first central space, and the circuit component is electrically connected to the coil.

The embodiments of the present disclosure further provides a method for installing a wireless power transmitting module, including: providing an insulating bracket, wherein a first side of the insulating bracket has a first central space; providing a coil, and disposing the coil to be around the first central space; and providing a circuit component, locating at least a part of the circuit component in the first central space, and electrically connecting the circuit component with the coil.

The wireless power transmitting module and the installation method thereof of the present disclosure make full use of the central blank space of the coil, and place the circuit component at the center of the coil, thereby realizing the miniaturized structure, improving space utilization and greatly reducing the volume thereof. At the same time, by reasonably arranging the structure of the insulating bracket, the structure of the wireless power transmitting module may be compact, the wireless power transmitting module may be manufactured conveniently, and the problem of electrical insulation may be effectively resolved. In additional, by providing the magnetic-shielding mask between the coil and the circuit, the influence of the magnetic field generated by the coil on the circuit component can be effectively shielded. Finally, by arranging the mechanical structure having the anti-pressure function, influence from the mechanical force applied to the insulating housing on the internal components, may be effectively reduced, such that the present disclosure can be widely applied to various wireless power transmission occasions.

BRIEF DESCRIPTION OF THE DRAWINGS

Other features, objects and advantages of the disclosure will be apparent upon reading the following detailed but non-limitative description of the embodiments made with reference to the enclosed drawings.

DETAILED DESCRIPTION

Figure 1:
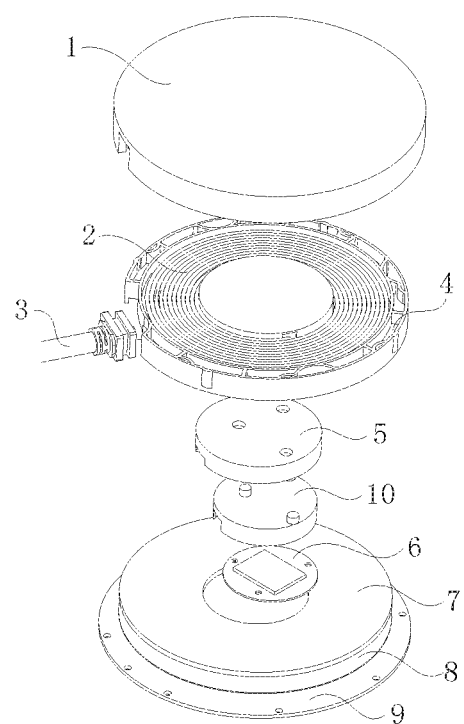
FIG. 1 is an exploded view illustrating a wireless power transmitting module according to a first embodiment of the present disclosure.

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. In the drawings, the thickness of the region and layer may be exaggerated for clarity. The same reference numerals in the drawings denote the same or similar structures, and thus their detailed descriptions will be omitted.

Figure 2:
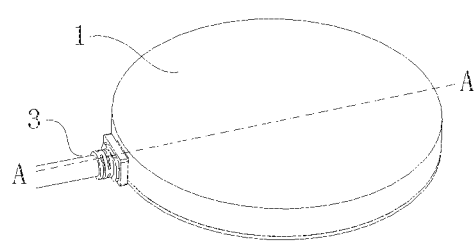
FIG. 2 is an assembly view illustrating a wireless power transmitting module according to a first embodiment of the present disclosure.
Figure 3:
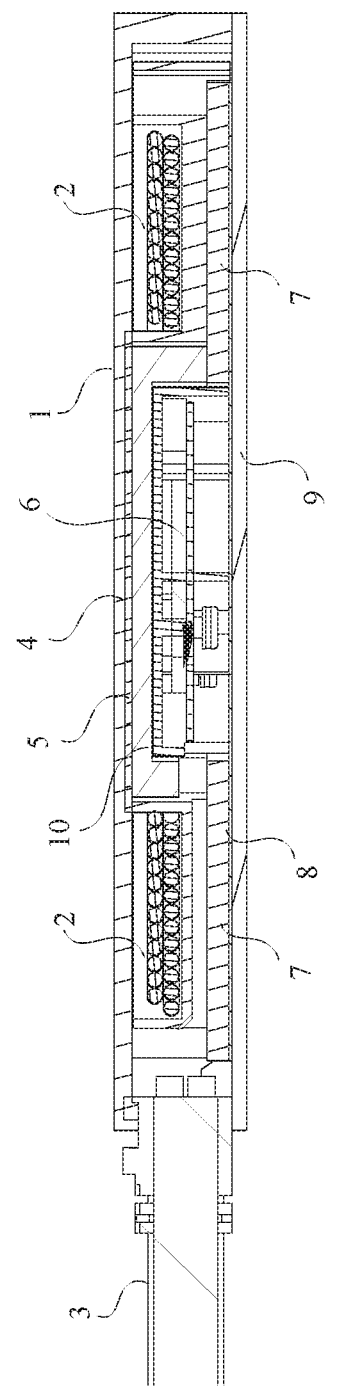
FIG. 3 is a sectional view taken along direction A-A illustrating a wireless power transmitting module according to a first embodiment of the present disclosure.
Figure 4:
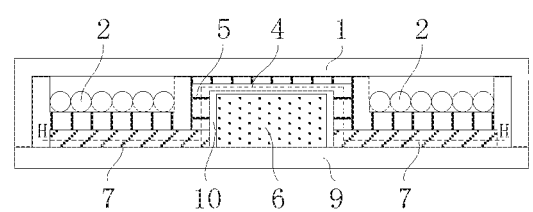
FIG. 4 is a partial schematic view of a sectional view illustrating a wireless power transmitting module according to a first embodiment of the present disclosure.
Figure 5:
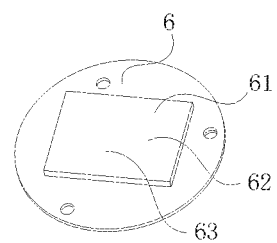
FIG. 5 is a schematic view illustrating a circuit component of a wireless power transmitting module according to a first embodiment of the present disclosure.

FIG. 1 is an exploded view illustrating a wireless power transmitting module according to a first embodiment of the present disclosure. FIG. 2 is an assembly view illustrating a wireless power transmitting module according to a first embodiment of the present disclosure. FIG. 3 is a sectional view taken along direction A-A illustrating a wireless power transmitting module according to a first embodiment of the present disclosure. FIG. 4 is a partial schematic view of a sectional view illustrating a wireless power transmitting module according to a first embodiment of the present disclosure. FIG. 5 is a schematic view illustrating a circuit component of a wireless power transmitting module according to a first embodiment of the present disclosure. As shown in FIG. 1 to FIG. 5, the wireless power transmitting module of the embodiment can be used as a wireless power transmitting module or as a wireless power receiving module in wireless power transmission, which includes a coil 2, an insulating bracket 4, a magnetic-shielding mask 5, a circuit component 6 and a magnetic core component 7.

A first side of the insulating bracket 4 has a first central space, and the coil 2 is disposed around the first central space. In some embodiments, a coil fixing portion may be disposed on the first side of the insulating bracket 4, the first central space is formed by the enclosure of the coil fixing portion, and the coil 2 is arranged in the coil fixing portion and disposed around the first central space. At least a part of the circuit component 6 is located in the first central space, and the circuit component 6 is electrically connected to the coil 2. The at least a part of circuit component 6 occupies the center of the horizontal space in which the coil 2 is located, wherein the space location, at which the at least a part of the circuit component 6 is located, is a blank area in the prior art. The insulating bracket 4 includes an annular portion and a central convex plate protruding toward the first side of the insulating bracket 4 from the inner edge of the annular portion. The central convex plate has an accommodating trough, and the opening direction of the accommodating trough is toward the second side of the insulating bracket 4, wherein the annular portion may have a circular annular shape, a rectangular annular shape or other shapes. The insulating bracket 4 realizes electrical isolation between the coil 2 and the magnetic core component 7, and the coil fixing portion of the insulating bracket 4 may protect the coil 2 in the coil fixing portion from deforming by being pressed. The coil 2 is distributed on the first side of the annular portion and surrounds the central convex plate, and the magnetic-shielding mask 5 and at least a part of the circuit component 6 is located in the accommodating trough. The magnetic-shielding mask 5 covers the circuit component 6, so as to shield the influence of the magnetic field, generated by the coil 2, on the circuit component 6. The disclosure divides the internal space of the wireless power transmitting module by the shape of the insulating bracket 4 so as to separate the coil 2 from the circuit component 6, and, further disposes the magnetic-shielding mask 5, contacting with the insulating bracket 4, between the coil 2 and the circuit component 6, to shield the influence of the magnetic field, generated by the coil 2, on the circuit component 6, which may fully utilize the internal space, such that, not only the miniaturization of the overall volume of the wireless power transmitting module is ensured, but also the interference of the magnetic field, generated by the coil 2 in the dense space, on the circuit component 6, is avoided.

The magnetic core component 7 supports the second side of the insulating bracket 4 and the magnetic-shielding mask 5. The magnetic core component 7 includes a plurality of magnet sheets arranged in a ring shape around the circuit component 6, and at least a part of the circuit component 6 is located in a second central space formed by the enclosure of the magnetic core component 7. The magnetic-shielding mask 5 may effectively shield the circuit component 6 from being cut by the magnetic field generated by the coil 2, thereby preventing the circuit component 6 from generating heat due to being cut by the magnetic field. At the same time, the magnetic core component 7 provides magnetic shield on the underside of the coil 2, so as to reduce leakage magnetic flux to the underside of the coil 2. The combination of the magnetic-shielding mask 5 and the magnetic core component 7 forms a continuous anti-magnetic barrier (see the auxiliary line H-H shown as a broken line in FIG. 4), and the anti-magnetic barrier effectively separates the coil 2 from the circuit component 6 and shields the influence of the magnetic field, generated by the coil 2, on the circuit component 6.

In the present embodiment, the wireless power transmitting module further includes an insulating housing 1 and an insulating pad 8 (see FIGS. 1 and 3). An annular first accommodating space is formed between the insulating housing 1 and the first side of the insulating bracket 4, and the coil 2 is encapsulated in the first accommodating space. A second accommodating space is formed between the insulating pad 8 and the second side of the insulating bracket 4, and the magnetic-shielding mask 5, the circuit component 6 and the magnetic core component 7 are encapsulated in the second accommodating space. The magnetic-shielding mask 5 is a reversed cup structure that cooperates with the cylindrical second accommodating space to maximize the use of the second accommodating space.

In the present embodiment, the wireless power transmitting module further includes a base 9, and the base 9 supports the insulating pad 8 and the second side of the insulating bracket 4. The insulating bracket 4 further includes an annular supporting sidewall extending from the outer edge of the annular portion toward the second side of the insulating bracket 4, the annular supporting sidewall surrounds the magnetic core component 7, and the annular supporting sidewall presses and connects the base 9. The upper portion of the insulating bracket 4 supports the insulating housing 1, and the lower portion of the insulating bracket 4 presses and connects the base 9, that is, the insulating bracket 4 is formed as an integrated support structure.

In the present embodiment, the wireless power transmitting module further includes a circuit component bracket 10, the circuit component bracket 10 is disposed between the magnetic-shielding mask 5 and the circuit component 6, and the magnetic-shielding mask 5 and the circuit component bracket 10 are provided with respective wire holes corresponding to each. The circuit component 6 can be fixed onto the circuit component bracket 10 by filling glue or by screwing, then both of them are mounted together with the magnetic-shielding mask 5. The wire holes are used for the coil 2 to pass through, thereby realizing electrical connection between the coil 2 and the circuit component 6.

In the present embodiment, the top of the circuit component bracket 10 is provided with protrusions. The protrusions penetrate the magnetic-shielding mask 5, and penetrate the central convex plate of the insulating bracket 4 or contact the central convex plate of the insulating bracket 4. When external mechanical force is applied to the insulating housing 1, the protrusions can effectively conduct the force to the base 9, such that the influence of external mechanical force on the magnetic core and the coil can be effectively prevented.

In the present embodiment, the wireless power transmitting module further includes a cable 3. The cable 3 can be installed into the insulating bracket 4 by injecting PVC (polyvinyl chloride) or similar manners, and electrically connected to the circuit component 6.

In the present embodiment, the circuit component 6 includes at least one circular circuit board. The circuit board is paralleled with the plane, in which the coil 2 is located, to each other, so as to maximize the use of the space in the magnetic-shielding mask 5 and reduce the thickness of the circuit component 6, but not limited thereto. In one modified example, the circuit component 6 may be arranged as a plurality of circuit boards that are perpendicular to the plane in which the coil 2 is located as well. A compensation circuit 61 is provided on the circuit board so as to realize assembly that the compensation circuit 61 is integrated with the coil 2. However in other embodiments, a power circuit 62 or a control circuit 63 may be disposed on the circuit board as well, and the present disclosure is not limited thereto.

The present disclosure makes full use of the central space of the coil, and places the circuit component (which may include all of the compensation circuit or a part of the power circuit and the control circuit) at the center of the coil, thereby realizing a miniaturized structure. At the same time, electrical insulation between the coil and the circuit component is realized by the insulating bracket. In addition, by providing a magnetic-shielding mask between the coil and the circuit component, the problem of high loss and high temperature caused by that the circuit component is in the magnetic flux, is effectively solved.

Figure 6:
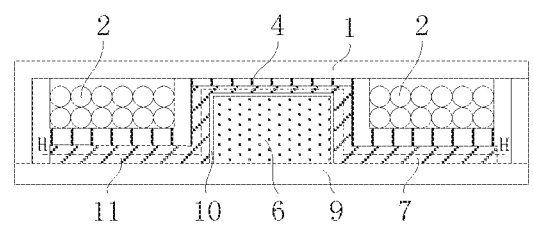
FIG. 6 is a schematic view illustrating a structure of a wireless power transmitting module according to a second embodiment of the present disclosure.

FIG. 6 is a schematic view illustrating a structure of a wireless power transmitting module according to a second embodiment of the present disclosure. As shown in FIG. 6, the second embodiment of the wireless power transmitting module of the present disclosure is substantially similar to the first embodiment thereof except that, in the second embodiment, a magnetic bracket 11 is formed integrally by the magnetic-shielding mask 5 and the magnetic core component 7. By referring to the first embodiment, it can be seen that the magnetic bracket 11 is disposed between the coil 2 and the circuit component 6 to form a continuous anti-magnetic barrier (see the auxiliary line H-H shown as a broken line in FIG. 6), and the anti-magnetic barrier effectively separates the coil 2 from the circuit component 6 and shields the influence of the magnetic field, generated by the coil 2, on the circuit component 6. Moreover, the upper portion of the magnetic bracket 11 supports and contacts the insulating bracket 4, and the lower portion presses and connects the insulating pad 8 (see FIGS. 1 and 3), to form an integrated support effect. That is, cooperating with the insulating bracket 4, the magnetic bracket 11 may further enhance the strength of the internal components in the wireless power transmitting module, reduce the influence of external mechanical force on the internal components, avoid the risk of sliding of the internal components in the first embodiment, and even simplify the installation of the wireless power transmitting module. Other technical features are as described above and will not be described here.

The wireless power transmitting module of the disclosure has a compact structure and may be easily manufactured. At the same time, the wireless power transmitting module of the disclosure reasonably solves electrical insulation, and provides a magnetic shield function, which can effectively shield the influence of the magnetic field, generated by the coil, on the circuit component. In addition, the wireless power transmitting module of the disclosure has the advantage of reducing influence, from the mechanical force applied to the insulating housing, on the internal components, and can be widely applied to various wireless power transmission occasions.

Figure 7:
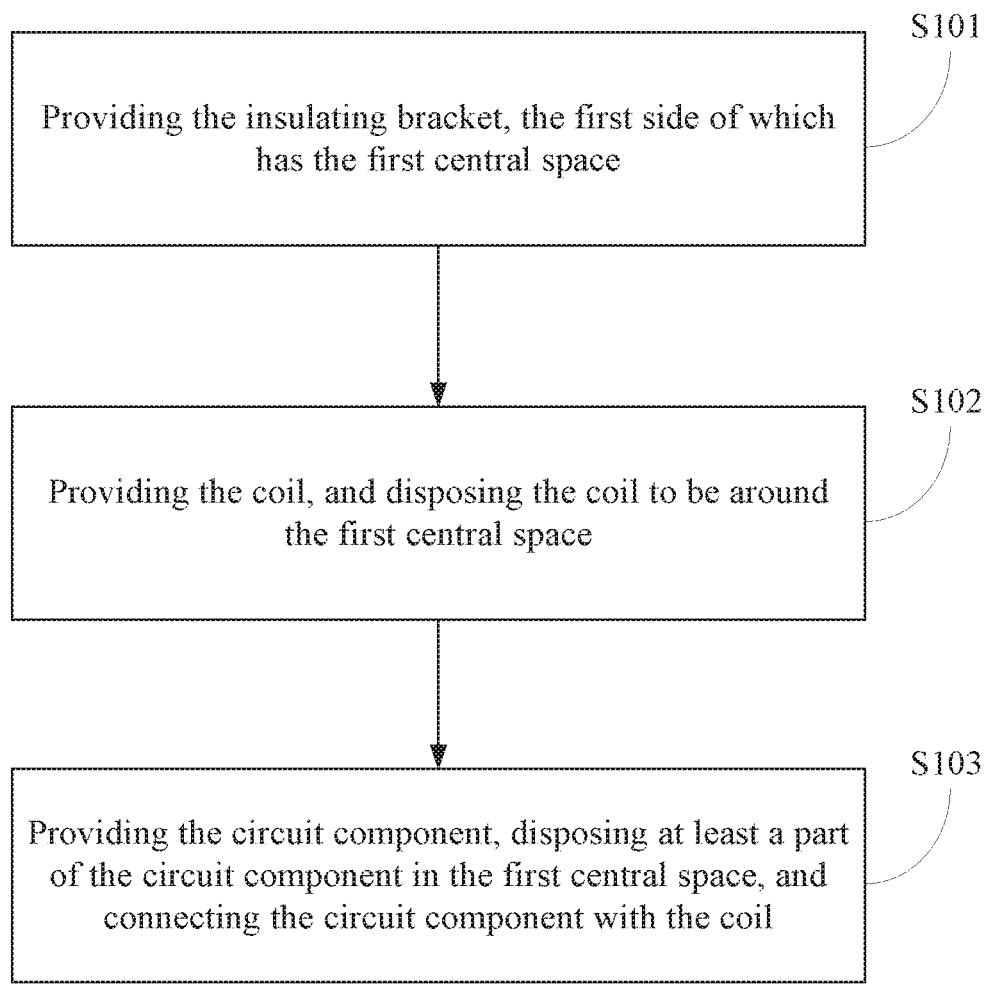
FIG. 7 is a flow chart of a method for installing a wireless power transmitting module according to an embodiment of the present disclosure.

FIG. 7 is a flow chart of a method for installing a wireless power transmitting module according to an embodiment of the present disclosure. As shown in FIG. 1 and FIG. 7, this embodiment provides a method for installing the wireless power transmitting module, which mainly includes the following steps S101-S103.

In step S101, the insulating bracket 4 is provided, and the first side of the insulating bracket 4 has the first central space.

In step S102, the coil 2 is provided, and the coil 2 is disposed around the first central space.

In step S103, the circuit component 6 is provided, at least a part of the circuit component 6 is disposed in the first central space, and the circuit component 6 is electrically connected to the coil 2.

In a preferred embodiment, the installation method of the present disclosure further includes providing a magnetic-shielding mask 5 that covers the circuit component 6 and shields the influence of the magnetic field, generated by the coil 2, on the circuit component 6.

In a preferred embodiment, the installation method of the present disclosure further includes providing the cable 3 that is installed into the insulating bracket 4 and is electrically connected to the circuit component 6.

In a preferred embodiment, the installation method of the present disclosure further includes providing the insulating housing 1 that cooperates with the insulating bracket 4 to seal the coil 2.

In a preferred embodiment, the installation method of the present disclosure further includes providing the magnetic core component 7, the insulating pad 8 and the base 9, wherein the magnetic core component 7 supports the second side of the insulating bracket 4. The second accommodating space is formed between the insulating pad 8 and the second side of the insulating bracket 4, and the magnetic-shielding mask 5, the circuit component 6 and the magnetic core component 7 are encapsulated in the second accommodating space. The base 9 supports the insulating pad 8 and the second side of the insulating bracket 4. The insulating bracket 4 further includes the annular portion and the annular supporting sidewall extending from the outer edge of the annular portion toward the second side of the insulating bracket 4, the annular supporting sidewall surrounds the magnetic core component 7, and the annular supporting sidewall presses and connects the base 9.

In a preferred embodiment, the magnetic-shielding mask 5 and the magnetic core component 7 are formed integrally.

In summary, the wireless power transmitting module and the installation method thereof of the present disclosure make full use of the central blank space of the coil, and place the circuit component at the center of the coil, thereby realizing the miniaturized structure, improving space utilization and greatly reducing the volume thereof. At the same time, by reasonably arranging the structure of the insulating bracket, the structure of the wireless power transmitting module may be compact, the wireless power transmitting module may be installed conveniently, and the problem of electrical insulation may be effectively resolved. In additional, by providing the magnetic-shielding mask between the coil and the circuit, the influence of the magnetic field, generated by the coil, on the circuit component can be effectively shielded. Finally, by arranging the mechanical structure having the anti-pressure function, influence, from the mechanical force applied to the insulating housing, on the internal components, may be effectively reduced, such that the present disclosure can be widely applied to various wireless power transmission occasions The above is a further detailed description of the present disclosure in combination with the specific preferred embodiments, and it shall not be construed that the specific embodiments of the present disclosure are only limited to these descriptions. Under the precondition of not escaping from the concept of this disclosure, those ordinary technicians in the technical field to which this disclosure belongs may make some simple deductions or replacements, which shall be regarded as within the protection scope of the present disclosure.

What is claimed is:

1. A wireless power transmitting module, comprising:
   an insulating bracket, wherein a first side of the insulating bracket has a first central space;
   a coil, disposed to around the first central space;
   a circuit component, wherein at least a part of the circuit component is located in the first central space, and the circuit component is electrically connected to the coil; and
   a magnetic-shielding mask, covering the circuit component, and shielding a magnetic field, generated by the coil, on the circuit component,
   wherein
   the insulating bracket comprising n annular portion, and a central convex plate protruding toward the first side of the insulating bracket from an inner edge of the annular portion, the central convex plate has an accommodating trough, and an opening direction of the accommodating trough is towards a second side of the insulating bracket, and
   the coil is distributed on a first side of the annular portion and surrounds the central convex plate, and the magnetic-shielding mask and at least a part of the circuit component are located in the accommodating trough.

2. The wireless power transmitting module of claim 1, further comprising:
   a magnetic core component, supporting the second side of the insulating bracket.

3. The wireless power transmitting module of claim 2, wherein
   the magnetic-shielding mask and the magnetic core component are formed integrally.

4. The wireless power transmitting module of claim 2, wherein
   the magnetic core component comprises a plurality of magnet sheets arranged in a ring shape around the circuit component, and at least a part of the circuit component is located in a second central space formed by an enclosure of the magnetic core component.

5. The wireless power transmitting module of claim 2, further comprising:
   an insulating housing; and
   an insulating pad,
   wherein a first accommodating space is formed between the insulating housing and the first side of the insulating bracket, and the coil is encapsulated in the first accommodating space, and a second accommodating space is formed between the insulating pad and the second side of the insulating bracket, and the magnetic-shielding mask, the circuit component and the magnetic core component are encapsulated in the second accommodating space.

6. The wireless power transmitting module of claim 5, further comprising:
   a base, supporting the insulating pad and the second side of the insulating bracket.

7. The wireless power transmitting module of claim 6, wherein
   the insulating bracket further comprises an annular supporting sidewall extending from an outer edge of the annular portion to the second side of the insulating bracket, the annular supporting sidewall surrounds the magnetic core component, and the annular supporting sidewall presses and connects the base.

8. The wireless power transmitting module of claim 1, further comprising:
   a circuit component bracket, disposed between the magnetic-shielding mask and the circuit component, wherein the magnetic-shielding mask and the circuit component bracket are provided with respective wire holes corresponding to each.

9. The wireless power transmitting module of claim 8, wherein
   a top of the circuit component bracket is provided with protrusions, and the protrusions penetrate the magnetic-shielding mask, and penetrate the central convex plate of the insulating bracket or contact the central convex plate of the insulating bracket.

10. The wireless power transmitting module of claim 1, further comprising:
    a cable, installed into the insulating bracket, and electrically connected to the circuit component.

11. The wireless power transmitting module of claim 1, wherein
    the circuit component comprises a compensation circuit.

12. The wireless power transmitting module of claim 11, wherein
    the circuit component further comprises a power circuit or a control circuit.

13. A method for installing a wireless power transmitting module, comprising:
    providing an insulating bracket, wherein a first side of the insulating bracket has a first central space;
    providing a coil, and disposing the coil to be around the first central space;
    providing a circuit component, locating at least a part of the circuit component in the first central space, and electrically connecting the circuit component with the coil; and
    providing a magnetic-shielding mask covering the circuit component and shielding influence of magnetic field, generated by the coil, on the circuit component,
    wherein
    the insulating bracket comprises an annular portion, and a central convex plate protruding toward the first side of the insulating bracket from an inner edge of the annular portion, the central convex olate has an accommodating trough, and an opening direction of the accommodating trough is towards a second side of the insulating bracket, and
    the coil is distributed on a first side of the annular portion and surrounds the central convex plate, and the magnetic-shielding mask and at least a part of the circuit component are located in the accommodating trough.

14. The method for installing a wireless power transmitting module of claim 13, further comprising:
proviarding a magnetic core component supporting a second side of the insulating bracket.

15. The method for installing a wireless power transmitting module of claim 14, wherein
the magnetic-shielding mask and the magnetic core component are formed integrally.

* * * * *